US008656191B2

(12) United States Patent
Kudelski

(10) Patent No.: US 8,656,191 B2
(45) Date of Patent: *Feb. 18, 2014

(54) SECURE SYSTEM-ON-CHIP

(71) Applicant: Nagravision S.A., Chesseaux-sur-Lausanne (CH)

(72) Inventor: Andre Kudelski, Cheseaus-sur-Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/713,675

(22) Filed: Dec. 13, 2012

(65) Prior Publication Data
US 2013/0124874 A1 May 16, 2013

Related U.S. Application Data

(63) Continuation-in-part of application No. 11/614,816, filed on Dec. 21, 2006, now Pat. No. 8,356,188.

(30) Foreign Application Priority Data

Dec. 23, 2005 (EP) .................................. 05112980

(51) Int. Cl.
G06F 12/14 (2006.01)
(52) U.S. Cl.
USPC ............................... 713/194; 380/201; 726/9
(58) Field of Classification Search
None
See application file for complete search history.

(56) References Cited

U.S. PATENT DOCUMENTS 5,533,123 A 7/1996 Force et al.
5,883,956 A 3/1999 Le et al.
(Continued)

FOREIGN PATENT DOCUMENTS

WO WO 2004/015553 2/2004
WO WO 2006/056572 6/2006

OTHER PUBLICATIONS

European Search Report issued in EP 05 11 2980, dated Sep. 14, 2006.
U.S. Appl. No. 11/614,816.
(Continued)

Primary Examiner — Fikremariam A Yalew
(74) Attorney, Agent, or Firm — DLA Piper LLP US

(57) ABSTRACT

A secure system-on-chip for processing data, the system-on-chip comprising at least a central processing unit (CPU), an input and an output channel, an encryption/decryption engine and a memory, wherein, said input channel comprises an input encryption module to encrypt all incoming data, said output channel comprising an output decryption module to decrypt all outgoing data, said CPU receiving the encrypted data from the input encryption module and storing them in the memory, and while processing the stored data, said CPU reading the stored data from the memory, requesting decryption of same in the encryption/decryption engine, processing the data and requesting encryption of the result by the encryption/decryption engine and storing the encrypted result, outputting the result to the output decryption module for decryption purpose and exiting the decrypted result via the output channel.

18 Claims, 3 Drawing Sheets

(56) References Cited

U.S. PATENT DOCUMENTS

| | | |
|---|---|---|
| 6,681,331 B1 | 1/2004 | Munson et al. |
| 7,058,918 B2 | 6/2006 | Abramovici et al. |
| 7,093,295 B1 | 8/2006 | Saito |
| 7,185,367 B2 | 2/2007 | Munson |
| 7,289,537 B1 | 10/2007 | Devanagondi et al. |
| 7,352,206 B1 | 4/2008 | Zhu et al. |
| 7,420,952 B2 | 9/2008 | da Costa et al. |
| 7,472,051 B2 | 12/2008 | Mariani et al. |
| 7,587,611 B2 | 9/2009 | Johnson et al. |
| 7,596,144 B2 | 9/2009 | Pong |
| 7,596,812 B2 | 9/2009 | Li et al. |
| 7,681,247 B2 | 3/2010 | Williams |
| 7,725,784 B2 | 5/2010 | Laouamri et al. |
| 2004/0010712 A1 | 1/2004 | Hui et al. |
| 2004/0158721 A1 | 8/2004 | Candelore |
| 2004/0240394 A1 | 12/2004 | Cochard et al. |
| 2005/0033969 A1 | 2/2005 | Kiiveri et al. |
| 2005/0050387 A1 | 3/2005 | Mariani et al. |
| 2005/0060567 A1 | 3/2005 | Shannon et al. |
| 2005/0086497 A1 | 4/2005 | Nakayama |
| 2005/0086665 A1 | 4/2005 | Matsuura |
| 2005/0114619 A1 | 5/2005 | Matsuo et al. |
| 2005/0213766 A1 | 9/2005 | Goss |
| 2005/0237083 A1 | 10/2005 | Bakker et al. |
| 2006/0075252 A1 | 4/2006 | Kallahalla et al. |
| 2006/0109982 A1 | 5/2006 | Puiatti et al. |
| 2006/0274788 A1 | 12/2006 | Pong |
| 2007/0050642 A1 | 3/2007 | Flynn et al. |
| 2007/0067644 A1 | 3/2007 | Flynn et al. |
| 2007/0106923 A1 | 5/2007 | Aitken et al. |
| 2007/0150752 A1 | 6/2007 | Kudelski |
| 2007/0150756 A1 | 6/2007 | Kudelski |
| 2008/0034334 A1 | 2/2008 | Laouamri et al. |
| 2008/0271146 A1 | 10/2008 | Rooney et al. |

OTHER PUBLICATIONS

U.S. Appl. No. 11/614,696.

European Search Report issued in EP 05 11 2983, dated Jun. 16, 2006.

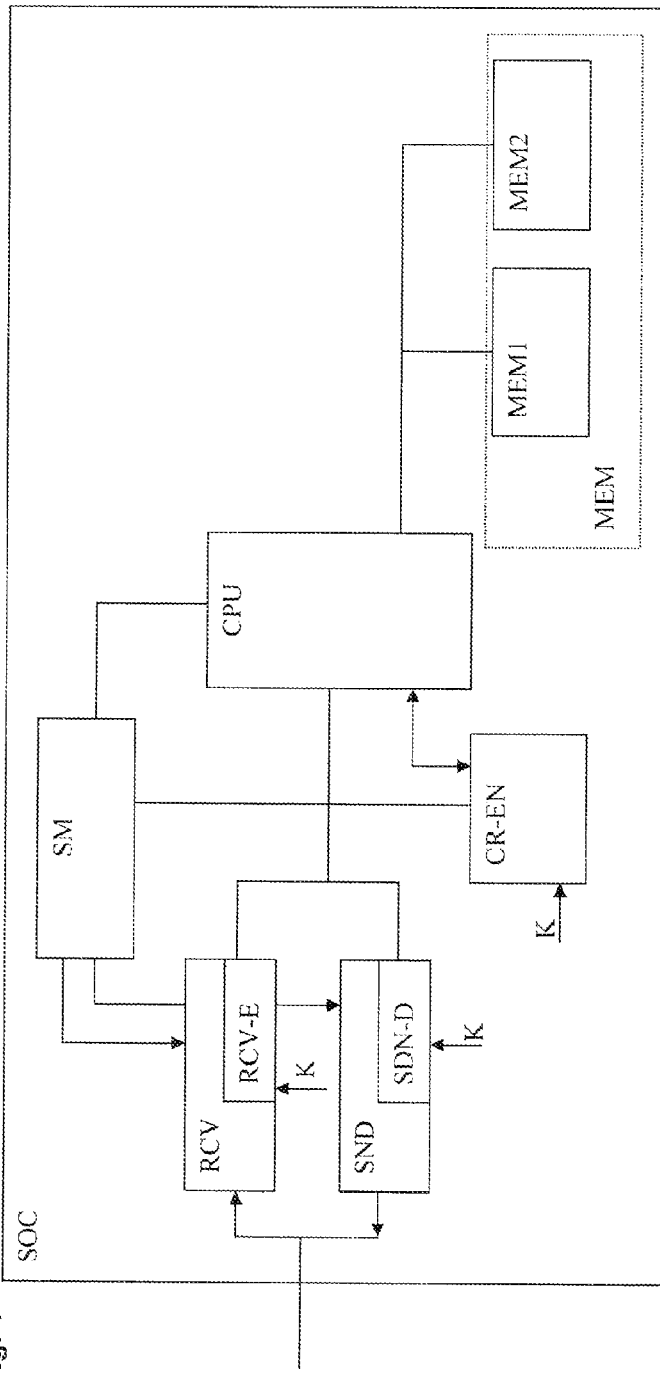
Fig. 1
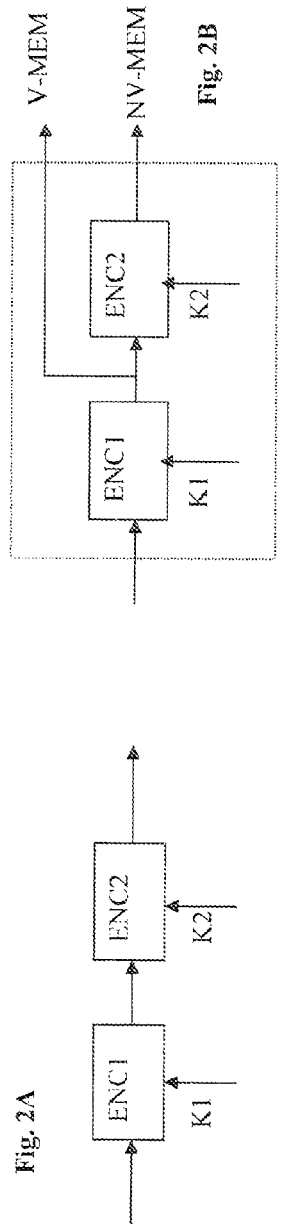
Fig. 2A
Fig. 2B

US 8,656,191 B2

SECURE SYSTEM-ON-CHIP

INTRODUCTION

The present invention concerns the field of systems-on-chip and in particular security for system on chip.

BACKGROUND ART

A system-on-a-chip or system on chip (SoC or SOC) is an idea of integration of all components of a computer or other electronic system into a single integrated circuit (chip). It may contain digital, analog, mixed-signal, and often radio-frequency functions—all on one chip. A typical application is in the area of embedded systems.

Secure environment for processors have previously been disclosed, in particular with respect to multi-processing architecture. For example, a solution to limit the access to a secure memory was described in the document WO04015553. According to this solution, the processor has two modes of operations; in the first mode, called the secure mode, access is permitted to the secure memory; and in the unsecure mode, the access to the secure memory is forbidden. The unsecure mode is intended to development purposes, i.e. testing or debugging the circuit. During the execution in unsecure mode, the access to the secure memory is physically blocked, i.e. a "disable" signal is generated. This "disable" signal forbids any attempt to access the secure memory.

Another solution is described in the document PCT/EP2005/056145 in which a single chip descrambling processor processes the scrambled audio/video data in order to never leave access to the clear data. When the descrambling operation is done, the descrambling unit comprises an encryption engine to encrypt the descrambled data before they are temporarily stored in an external memory. When the processor finishes the organization task, the data are decrypted in the output module and sent to the displaying device.

BRIEF DESCRIPTION OF THE INVENTION

The aim of the present invention is to provide a secure system-on-chip for processing data, the system-on-chip comprising at least a central processing unit, an input and an output channel, an encryption/decryption engine and a memory, characterized in that said input channel comprises an input encryption module to add an internal encryption layer on all incoming data, said output channel comprises an output decryption module to remove the internal encryption layer on all outgoing data, said central processing unit receiving the encrypted data from the input encryption module and storing them in the memory, and while processing the stored data, said central processing unit reading the stored data from the memory, requesting the removal of the internal encryption layer of same in the encryption/decryption engine, processing the data and requesting encryption of the result by the encryption/decryption engine so as to add the internal encryption layer and storing the encrypted result, outputting the result to the output decryption module for removing the internal encryption layer and exiting the result via the output channel.

The main feature of the invention is to add an encryption layer within the system-on-chip. The data entering into and exiting the system on chip are usually encrypted. An additional encryption layer is applied to these data so that all data stored in the system-on-chip have at least one encryption layer. Once the data are received in the system-on-chip, they are usually decrypted with the key pertaining to the transmission system and the result is stored in clear. In the present invention, one the encrypted message is read by the system-on-chip, an internal encryption layer is applied on this message and passed to the processing unit. Said unit can store it for further use or immediately process the message. While processing the message, the first step is to remove the internal encryption layer so that the data is in the same condition as received by the system-on-chip. After the message is processed and the right (e.g.) is extracted, this right is further encrypted to add the internal encryption layer before being stored.

The removal of the internal encryption layer occurs only at the later stage when the data are actually used by the central unit, the clear data being never accessible in a static state. When processed, the data can be stored in clear if they are for internal purpose or re-encrypted (i.e. adding the internal encryption layer) if they are intended to be outputted from the system-on-chip.

Once re-encrypted, the data are temporarily stored in a buffer before being sent to the output channel.

The key to encrypt and decrypt the data is in a preferred embodiment unique for that system-on-chip. This key can be preprogrammed at the manufacturing step or can be randomly generated at the initialization stage and never known by anybody. This key is used only internally. The algorithm used can be kept secret as well as the parameters of said algorithm. For example, the algorithm IdeaNxt is used as an encryption engine and the values of the substitution box are randomly generated in the system-on-chip.

According to a particular embodiment, the encryption/decryption algorithm is asymmetric, so that a key pair (public/private) is used to respectively encrypt and decrypt the data.

According to an alternative embodiment, the input encryption module can be replaced by a signature module, the data being signed while entering in the system-on-chip and the signature stored together with the data. When the central unit wishes to use this data, the encryption/decryption engine which is now a signature verification engine, checks the signature and authorizes the use of the data if the signature is correct.

By data it is meant a single byte or a set of bytes e.g. to form a message or a entitlement message in the system-on-chip.

BRIEF DESCRIPTION OF THE DRAWINGS

The invention will be better understood thanks to the attached figures in which:

the FIG. 1 describes the system-on-chip and its various elements in the encryption/decryption mode, the FIGS. 2A and 2B describes the encryption stage using two units, the FIG. 3 describes the system-on-chip and its various elements in the signature mod, the FIG. 4 describes the system-on-chip with an encryption, respectively decryption module for each security operation.

DETAILED DESCRIPTION OF THE INVENTION

The secure system-on-chip SOC is based on a central processing unit CPU. The aim of this unit is to execute the code and to perform the requested tasks. The system-on-chip SOC comprises two channels connected to the outer world, namely the input and the output channels. The input channel RCV comprises an input encryption module RCV-E which encrypts all the data coming from the outer world so as to add an internal encryption layer. In the same manner, the output channel SND comprises an output decryption module SND-D to decrypt the data received from the central unit CPU before sending them to the outer world so as to remove the internal encryption layer.

The central unit CPU has access to the encryption/decryption engine CR-EN. This engine has the same function as the input encryption module and the output decryption module. The key K loaded in the input encryption module is the same in the encryption part of the encryption/decryption engine. The same applies to the output decryption module and the decryption part of the encryption/decryption engine, for the decryption operations. When the central unit CPU needs some data, either directly coming from the input encryption module or fetched from the memory MEM, these data are first passed through the decryption engine to remove the internal encryption layer before they are used by the central unit CPU.

In the same manner, when the central unit CPU has completed a task and produces a result, the following step being to store the result (or output the result to the output channel). This result is previously passed through the encryption engine CR-EN for adding the internal encryption layer before being stored. This encrypted result can then be stored in a memory or sent to the output channel.

The central processing unit CPU can decide if the result is to be re-encrypted or left in clear. Instead of letting the processor to decide, the target location can select different behaviors as shown in FIG. 2A. In this case, the internal encryption layer is made of two encryption units ENC1, ENC2, using two different keys K1, K2, one permanent key, and one key randomly generated. If the result is to be stored in a volatile memory V-MEM, both encryption units will encrypt the data. In the contrary if the storage is in a non-volatile memory NV-MEM (EEPROM), only one encryption unit is used, the one with the permanent key. In the same manner, when reading data from the volatile memory, the double decryption is applied although reading data from the non-volatile memory, only one decryption unit is applied.

Figure 3:
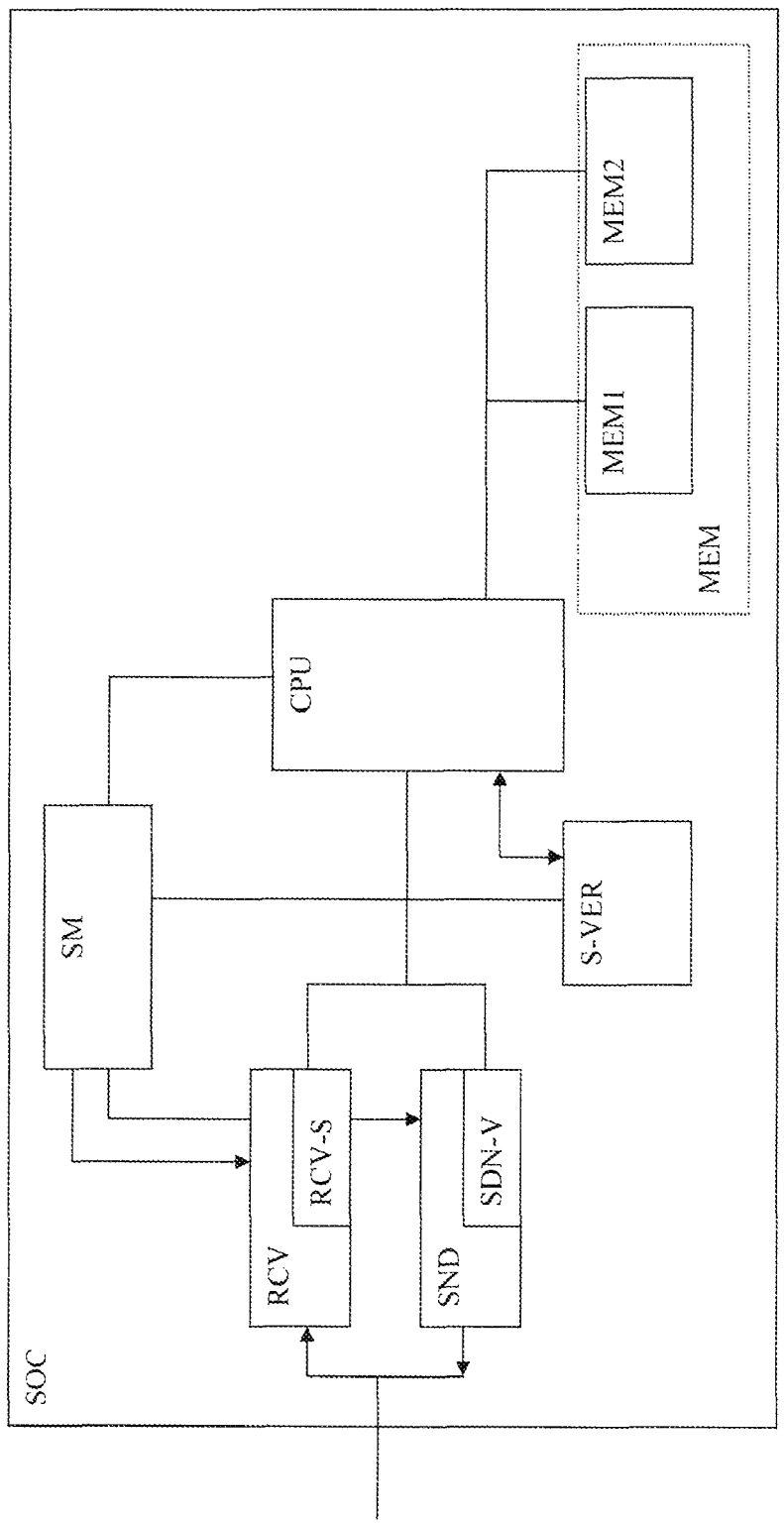

According to an alternative embodiment shows in the FIG. 3, the encryption process is replaced by a signature process. The data are not encrypted but a signature is generated and associated with the data. For all data coming from the outer world, a signature is calculated in the input signature module RCV-S. The data are then stored with their signatures. When the central unit needs to access these data, the signature verification engine S-VER first verifies the signature before the central unit has the right to use the data. Before the data are outputted by the output channel, the signature is verified in the output signature module SDN-V. The signature is then removed from the data which are sent to the output channel SND.

According to an alternative embodiment, the encryption/decryption engine is directly located in the central unit CPU. When a data is read from the memory, e.g. loading a variable in the accumulator of the CPU (e.g. LDAA #1200h for Motorola 68HC11), the data read at that location is passed automatically to the decryption engine so as to remove the internal encryption layer before being transferred to the accumulator. In the same manner, the instruction to store the content of the accumulator to the memory (e.g. STAA #1200h) is not directly executed but the data in the accumulator is previously passed through the encryption engine (so as to add the internal encryption layer) before being stored at the location 1200h.

In a particular embodiment, the encryption/decryption engine is shared with the input and output channel. The input encryption module is therefore a virtual module and encryption operations at the input channel are achieved by the encryption engine through a data multiplexer. The data entering into the system-on-chip SOC, in particular through the input channel are passed through the encryption engine before further manipulation e.g. to store the data in an input buffer. The input encryption module is therefore a virtual module using the resource of the encryption/decryption engine in encryption mode. The same apply for the output decryption module which uses the encryption/decryption engine in decryption mode.

The input encryption module RCV-E can comprise more than one encryption unit. According to a particular embodiment shows in the FIG. 2A, two encryption units (or more) are connected in series, each having a different key. The first encryption unit is loaded with a key K1 which pertains to the system-of chip, i.e. is unique and constant for a specific device. This key is either loaded during the installation step or generated internally. The second unit ENC2 is loaded with a key K2 which is dynamically generated at the power up of the device. When the system-on-chip is reinitialized, this key is lost and a new key is generated. The data which have to be permanently stored, once processed by the processor CPU, are only re-encrypted with the first unit with the permanent key K1.

The output decryption module as well as the encryption/decryption engine comprises in the same manner also two or more units.

Alternatively, if the processor CPU recognizes that the received data, stored in an input buffer, don't need to be processed but only have to be stored in a permanent memory NV-MEM, the processor can request from the encryption/decryption engine the decryption by only one decryption unit, i.e. the unit having the volatile key. The stored data still remain encrypted by the permanent key for later use.

The system-on-chip SOC can additionally comprise an autonomous supervision module SM that can deterministically control the system-on-chip SOC. This module SM, comprises a normal working condition definitions of the system-on-chip SOC, and disabling means when the normal conditions are no longer fulfilled. This is achieved by different means. A first means includes measuring the quantity of data outputted, e.g. counting the number of data sets outputted. This operation will be hereafter described as counting data. A second means includes defining time windows during which input or output operations are allowed. A block of data is therefore is allowed if the length of same do not exceed the maximum time defined for a block. A third means includes detecting the state of the central unit CPU and their respective duration, and acting accordingly as will be illustrated hereafter. The central unit CPU typically has different possible states, such as acquisition state, processing state, waiting state and outputting result state. When a message arrives to the system-on-chip, the same switches from waiting state to acquisition state. During that acquisition state, the input channel is enabled by the supervision module SM. Also during the same acquisition state, the supervision module SM counts the data arriving and compares this number to a predefined maximum. Any abnormal situation leads to a warning state in which the central unit CPU can decide how to react. The supervision module SM has the capability, especially in case of a warning state, to block the input and output channels and/or the encryption/decryption engine CR-EN.

When the external message is received, the supervision module SM causes the central unit CPU to go to processing state. During this state, the input and output channels are disabled. The supervision module SM comprises a time pattern corresponding to the minimum processing time by the central unit CPU, and disables the channels during this time. The central unit CPU can inform the supervision module SM that no result will be outputted. This has the consequence that the supervision module SM only enables the input channel for waiting a new message. The output channel then remains disabled.

In a case where the central unit CPU wishes to send data to the external world, it then informs accordingly the supervision module SM, which in turn enables the output channel. The supervision module SM still continues to watch the activities on the output channel by counting the data sent and applying a time window during which the sending is authorized.

In this embodiment of the invention, the supervision module SM is thus able to work with information received from the central unit CPU, as well as with preprogrammed working patterns.

This module can also watch the encryption/decryption engine CR-EN by counting the data encrypted or decrypted. In the same manner, the working pattern of the encryption/decryption engine CR-EN is supervised in term of data quantity processed and time. The supervision module can disable the encryption/decryption engine CR-EN if abnormal conditions are detected.

It is to be noted that the supervision module SM can be implemented in a system-on-chip without the encryption/decryption in the input/output channel. The data are processed without adding an additional encryption (or decryption) level and the input/output channel is watched by the supervision module SM.

This System-on-chip SOC is used in secure access control module in charge of receiving management messages including rights or keys. This module can also comprise a high speed descrambling unit to receive an encrypted video data stream.

Figure 4:
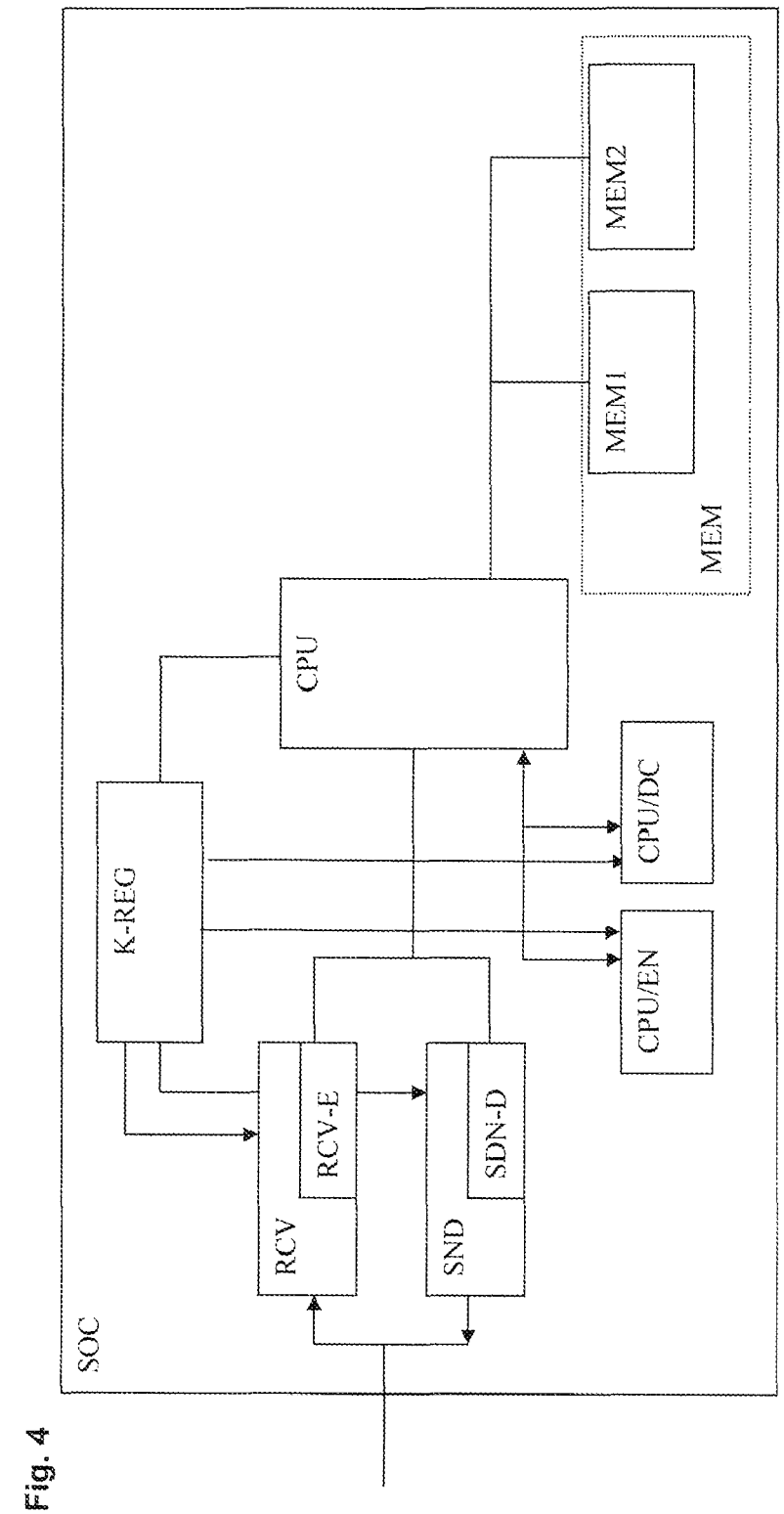

The embodiment of the FIG. 4 illustrates the SOC with one encryption or decryption module dedicated to each security operation within the chip. The input channel RCV comprises an input encryption module RCV-E in charge of adding an internal encryption layer to the incoming data. These data are not exposed to the other elements of the SOC and are accessible to the internal bus only after the encryption by the input encryption module.

Once encrypted, the data are manipulated by the CPU and stored in the memory MEM. When the CPU needs to process the stored data, it passes them to the CPU decryption module CPU/DC to remove the internal encryption layer. The data thus in clear are then processed by the CPU. It is to be noted that the data in clear are not necessary clear data since these data can have been encrypted before entering into the SOC. It is "clear data" in the sense that the internal encryption layer has been removed.

Once the CPU has terminated its processing, the resulting data are passed to the CPU encryption module to add the internal encryption layer. The encrypted data can then be stored into the memory MEM or outputted outside of the SOC. In the latter case, the encrypted data are passed to the output channel that comprises the output decryption module. The latter is in charge of removing the internal encryption layer.

In the FIG. 4, we could find the presence of a key register module K-REG in charge of distributing the key to the various encryption/decryption modules.

As previously described, the key K is a key that is not exposed outside of the SOC. The key K is stored in the key register K-REG for allocating the key to the modules when necessary. It is not necessary to load the key K into each module at the boot of the SOC. The CPU can synchronize the load of the key by sending a suitable instruction to the key register. At the boot, we can consider the case that only the input channel module has the key loaded into it. Once a message is received and duly encrypted by the input encryption module, the CPU is informed accordingly. In case that the CPU is willing to process the encrypted data, a request is sent to the key register to load the key K into the CPU decryption module. Once loaded, the CPU can then pass the encrypted data into the CPU decryption module to remove the internal encryption layer.

As an alternate version or in complement, the CPU decryption module can keep the key only for a short time, e.g. for a single data decryption and then deleted the key. The key can stay into the decryption module only for a short time. A timer is set when the key K is received in the CPU decryption module so that the key is automatically deleted after a JO predefined time.

The same mechanism can be applied into the output decryption module. The CPU should request the loading of the key into the output decryption module before sending data to the output channel. In standby, or when no data are supposed to the outputted from the SOC, the output decryption key register is empty.

According to one embodiment, the input encryption module and the output encryption module are a single module and thus having a single key register the input/output key register.

According to one embodiment, the CPU encryption module and the CPU encryption module are a single module and thus having a single key register the CPU key register. The key register can load one key into the CPU encryption/decryption module to allow the proper functioning of this module.

The invention claimed is:

1. A secure system-on-chip for processing data, the system-on-chip comprising:
    at least a central processing unit (CPU);
    an input channel connected to the CPU, the input channel including an input encryption module;
    an output channel connected to the CPU, the output channel including an output decryption module;
    a CPU encryption module connected to the CPU;
    a CPU decryption module connected to the CPU;
    at least one key register connected to the input encryption module and the output decryption module; and
    a memory connected to the CPU;
    wherein said input encryption module is configured to add an internal encryption layer to all incoming data, said output decryption module is configured to remove the internal encryption layer on all outgoing data, and said central processing unit is configured to perform the steps of
    receiving encrypted data from the input encryption module;
    storing the encrypted data in the memory;
    when processing the stored data, reading the stored data from the memory, requesting the removal of the internal encryption layer by the CPU decryption module, processing the data and requesting encryption of the result by the CPU encryption module to add the internal encryption layer and storing the encrypted result; and
    outputting the result stored in the memory to the output decryption module for removing the internal encryption layer and outputting the result via the output channel;
    wherein data encrypted with the internal encryption layer is never present outside the system-on-chip.

2. The secure system-on-chip according to claim 1, wherein an encryption/decryption algorithm used to encrypt and decrypt the data is a symmetrical algorithm.

3. The secure system-on-chip according to claim 2, wherein the encryption/decryption algorithm uses a set of initialization constants and all or part of the initialization constants are randomly generated within the system-on-chip.

4. The secure system-on-chip according to claim 1, wherein an algorithm used to encrypt and decrypt the data is an asymmetrical algorithm.

5. The secure system-on-chip according to claim 1, wherein the secure system-on-chip is configured to generate randomly a key or key pair used by the input encryption module and the output decryption module and store the key or key pair into a key register.

6. The secure system-on-chip according to claim 1, wherein the input encryption module and the output decryption module comprise several encryption or decryption units respectively, at least one of these units being loaded with a key which is non-volatile and at least one of these units being loaded with a permanent key.

7. The secure system-on-chip according to claim 1, wherein encryption/decryption operations can be executed on one single data or a set of data at a time.

8. The secure system-on-chip according to claim 1, wherein the encryption and decryption modules are initialized by a key known only by the secure system-on-chip.

9. The secure system-on-chip according to claim 1, wherein the CPU encryption module and the CPU decryption module are connected to a key register containing a key for the cryptographic operations.

10. The secure system-on-chip according to claim 1, wherein the input encryption module and the output decryption module are connected to an input/output key register, and wherein the CPU encryption module and the CPU decryption module are connected to a CPU key register, said input/output key register and said CPU key register containing the key for the cryptographic operations and wherein the system-on-chip comprises a synchronization module to load the key into said input/output key register and said CPU key register.

11. The secure system-on-chip according to claim 1, wherein the input encryption module and the CPU encryption module are connected to an input/CPU key register, and wherein the output decryption module and the CPU decryption module are connected to a output/CPU key register, said input/CPU key register and said output/CPU key register containing a key for the cryptographic operations and wherein the system-on-chip comprises a synchronization module to load the key into said input/CPU key register and said output/CPU key register.

12. The secure system-on-chip according to claim 1, wherein the input encryption module is connected to an input key register, the CPU encryption module is connected to an CPU encryption key register, and wherein the output decryption module is connected to a decryption key register and the CPU decryption module is connected to a CPU decryption key register, said input key register, output key register, CPU encryption key register and CPU decryption key register containing a key for the cryptographic operations and wherein the system-on-chip comprises a synchronization module to load the key into said input key register, output key register, CPU encryption key register and CPU decryption key register.

13. A method for processing data on a secure system-on-chip, the system-on-chip comprising a central processing unit (CPU), an input channel, an output channel, an input encryption module, an output decryption module, a CPU encryption module, a CPU decryption module and a memory, the method comprising the steps of:

passing input data received via the input channel to the input encryption module to add a first internal encryption layer to the input data;

storing the input data with the first internal encryption layer in the memory;

retrieving the input data with the first internal encryption layer from the memory;

passing the encrypted input data retrieved from the memory to the CPU decryption module to remove the first internal encryption layer from the encrypted input data retrieved from the memory;

processing the data in the CPU;

passing the data processed by the CPU to the CPU encryption module to add the internal encryption layer to the processed data before the processed data is stored to the memory;

when passing the encrypted processed data to the output decryption module to remove the internal encryption layer when the stored data is outputted via the output channel, said output decryption module being directly connected to the output channel, wherein data encrypted with the internal encryption layer is never present outside the system-on-chip.

14. The method of claim 13, further comprising the steps of:

adding a second internal encryption layer to the processed data;

storing the processed data with the second internal encryption layer in the memory;

retrieving the processed data with the second internal encryption layer from the memory; and removing the second internal encryption layer from the processed data prior to outputting the processed data via the output channel.

15. The method of claim 14, wherein the first internal encryption layer uses a key known only by the secure system-on-chip.

16. The method of claim 15, wherein the input data is encrypted with an external encryption layer, and wherein the processing step comprises removing the external encryption layer.

17. The method of claim 15, wherein the first internal encryption layer is added by an input encryption module forming part of the input channel.

18. A method for processing data within a secure system-on-chip comprising the steps of;

processing data to form processed data;

passing the processed data through a virtual encryption module to an encryption/decryption engine to add an internal encryption layer to the processed data;

storing the processed data with the internal encryption layer in the memory;

retrieving the processed data with the internal encryption layer from the memory;

passing the processed data retrieved from the memory through the virtual encryption module to the encryption/decryption engine to remove the internal encryption layer from the processed data within the system on chip; and outputting the processed data from the system on chip without the internal encryption layer via the output channel wherein data encrypted with the internal encryption layer is never present outside the system-on-chip.

* * * * *